July 11, 1950 H. S. HELLER 2,514,577

MAGNETIC RECORDER POLE PIECE AND ASSEMBLY

Filed Sept. 11, 1946

HERMAN S. HELLER,
INVENTOR.

BY Forest J. Lilley

ATTORNEY.

Patented July 11, 1950

2,514,577

UNITED STATES PATENT OFFICE 2,514,577

MAGNETIC RECORDER POLE PIECE AND ASSEMBLY

Herman S. Heller, Los Angeles, Calif.

Application September 11, 1946, Serial No. 696,157

2 Claims. (Cl. 179—100.2)

My invention relates generally to magnetic sound recording apparatus and more particularly to the trace producing elements of such apparatus known generally as "pole pieces."

It is the general practice in the magnetic recording art, to move an elongated record strip of magnetizable and magnetically retentive material past one, or a pair of stationary magnetic pole pieces in which a magnetic flux is being induced. A tip of such pole piece is usually reduced in area and positioned in close proximity to the moving record strip in order that a part of the magnetic flux path is through the record material. The flux through the record material is concentrated and is alternated in direction or fluctuated in accordance with the audio vibrations of the sound being recorded, hence, a permanently magnetized sound track is produced on the record strip. This sound track may be played back by moving the record strip past the same or a similar pole piece or pole pieces and detecting and amplifying the alternating current induced around the pole piece by the motion of the permanently magnetized sound track past the tip thereof.

The recording and playing back procedures just described have long been known in the art, but because of a number of difficulties and limitations inherent in apparatus available previously, magnetic recording has not been a serious competitor to other methods.

One of the most serious limitations of magnetic sound recording has been the relatively large bulk of recording material required for a given length of sound record as compared with the amount of recording material required in other systems. This limitation arises from the fact that what may be termed the "resolving power" of previous magnetic recording apparatus has been relatively low. The term "resolving power" as used here refers to the ability of the apparatus to record and faithfully reproduce, relatively high audio frequencies at relatively low or moderate record speeds. It is obvious that with a given record speed, the maximum recordable frequency is increased as the longitudinal dimension of the pole piece tip is decreased. Thus, the optimum recording quality of magnetic apparatus is achieved with very thin pole tips transversely disposed with respect to the direction of record motion.

The improvement to be realized by reducing the longitudinal pole tip dimension is, however, seriously limited, in that the flux lines in the recording material itself tend to spread, particularly at high flux densities. This spreading effect is particularly noticeable in apparatus of the type where the flux path enters and leaves the record strip from the same surface thereof and results in the area of a finite magnetic pole instantaneously induced in the record strip, being somewhat larger than the area of the pole piece tip.

The spreading of flux lines in the record strip and the consequent loss of "resolving power" may be materially reduced by a type of recording referred to here as "through magnetization." This is a type of recording wherein the record strip is passed between two opposed pole pieces adjacent opposite surfaces thereof, and wherein the flux produced in the pole pieces is such that the sound-track-inducing flux lines pass directly through the thickness of the record strip. The sound track resulting from this type of magnetization consists in a series of permanently magnetized areas of alternating polarity, in which the direction of the magnetic field is normal to the surface of the record strip. It is highly essential in this type of recording, that the two pole pieces employed, be held with their tips in accurate alignment on the opposite side of the record strip—otherwise the advantages of "through magnetization" are largely lost.

Bearing in mind the foregoing difficulties, it is a major object of my invention to provide magnetic pole pieces for sound recording and reproducing apparatus, which are adapted to be held in accurate alignment with a moving record strip.

Another object of my invention is to provide mounting means for such pole pieces which is adapted to hold the same in sliding pressure contact with a moving record strip while maintaining the aforesaid alignment thereof.

Still another object of my invention is to provide a pole piece which is adapted to resist the wear occasioned by a moving record in contact therewith.

A further object is to provide mounting means of the class described wherein the pole pieces are adapted to be retracted for the purpose of inserting or removing a record strip.

The foregoing and other objects and advantages of my invention will become apparent from a consideration of the following description taken in connection with the attached drawings in which.

Throughout the drawings the numeral 10 indicates a pole piece constructed according to my invention which comprises a pair of mating shells 110 and 210, a laminated core 23, and a wear resisting sleeve 14. The mating shells 110 and 210 which enclose the core 23 may be constructed of various non-magnetic and insulating materials such as phenolic resin, cellulose acetate, and the like. Because of its high degree of dimensional stability, the ease and accuracy with which it may be moulded, and because of its non-hygroscopic nature, I prefer the use of a polystyrene resin base insulating material in the construction of the shells 110 and 210.

Figure 2:
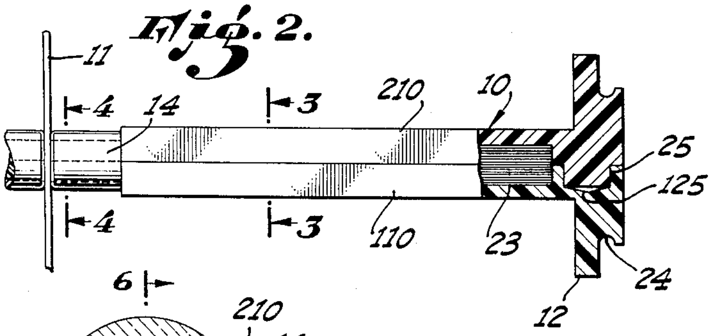
Figure 2 is a partially sectioned top view of one of the pole pieces shown in Figure 1.
Figure 3:
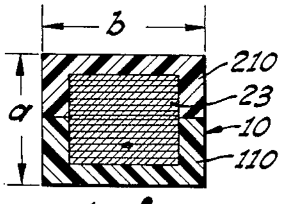
Figure 3 is an elevational section taken on the lines 3—3 in Figure 2.
Figures 4, 5:
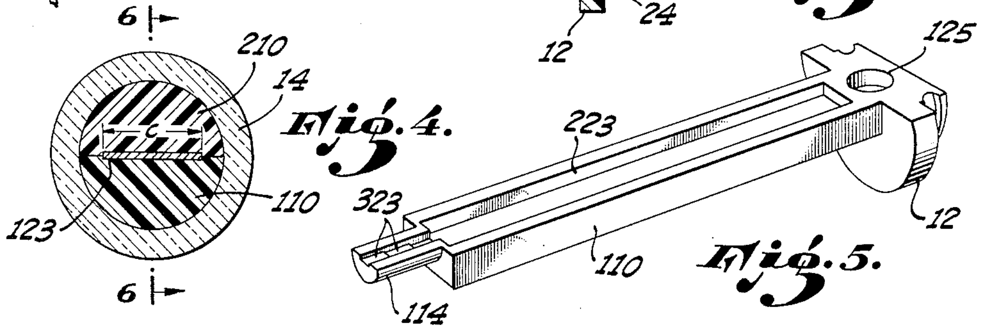
Figure 4 is an elevational section taken on the line 4—4 in Figure 2.
Figure 5 is a perspective view of a shell portion used in the construction of the device shown in Figure 2.

As can be seen in Figures 3 and 5 the shells 110 and 210 are each formed with conjugate recesses 223 therein, which, when the two shell portions are assembled together as shown in Figure 2, form an interior space in the pole piece 10 adapted to receive the core 23. In order to properly align the two halves of the shell 110 and 210, a projecting dowel pin 25 is formed in one of the shell halves 210 near the rear thereof adapted to enter a corresponding socket 125 formed in the other shell half 110. The tip end of the pole piece is formed with a projecting cylindrical portion 114 which is adapted to receive a cylindrical sleeve 14. The sleeve 14 is preferably constructed of a hard, wear-resisting material, such as for example glass and is highly polished at the outer end serving the dual purpose of securing the shell halves 110 and 210 together and providing a wear-resistant tip for the pole piece 10. The shell halves 110 and 210 are additionally secured by the application of a suitable adhesive cement at the joint.

Figure 1:
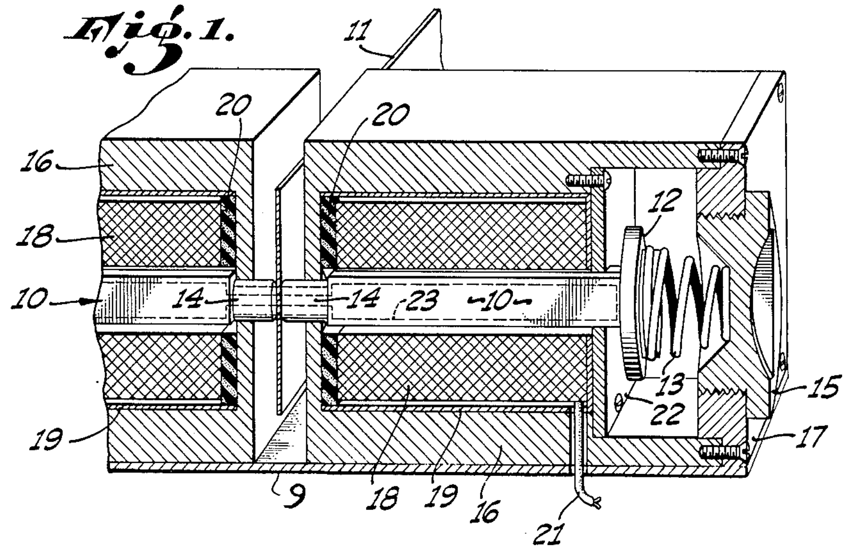
Figure 1 is a perspective view of a pair of pole pieces, and a mounting therefor, constructed according to my invention, the mounting means being sectioned on a vertical plane passing through the axis of the pole pieces.

As can be seen best in Figures 2 and 5 the rearward of the pole piece is formed with a relatively large circular flange 12 which serves both as a means for retracting the pole piece 10 in a manner to be described presently, and as an anchor for a helico-conical thrust spring 13 used in connection with the mounting of the pole piece 10 and illustrated in Figure 1. The spring 13 is secured to the pole piece 10 by having one turn thereof snapped into an annular groove 24 of semi-circular cross-section formed in the flange 12.

Figure 6:
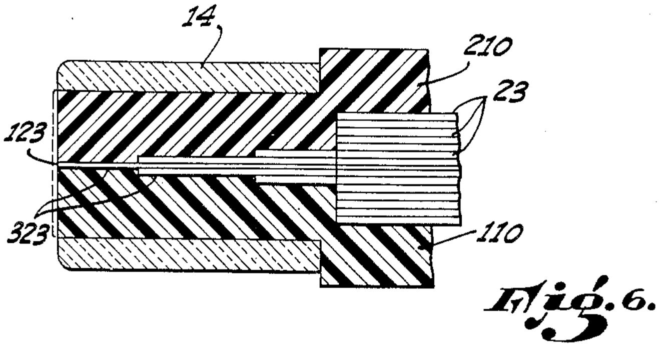
Figure 6 is an enlarged partial section taken on the line 6—6 in Figure 4.

As has been previously stated, the purpose of the pole piece is to carry magnetic flux induced therein into a moving record strip, the point of transfer between the pole piece and record strip being at a relatively reduced tip portion of the former. As can be seen from an examination of Figures 3 and 4 the core 23 is adapted to carry magnetic flux induced therein forwardly (to the left in Figure 2) the flux lines leaving the pole piece 10 through the end of a single forwardly extending lamination 123 centrally located in the stack which forms the core 23. It is essential for optimum recording qualities that the core have a high degree of magnetic permeability. To this end the laminations thereof are preferably constructed of a highly permeable material such as silicon steel or similar metal. As can be seen from an examination of Figure 6, the laminations of the core 23 are of various lengths so as to produce a step by step reduction in thickness of the total stack resulting in the concentration of all the magnetic flux in the single center lamination 123. It is also essential that the total reluctance to the flux passing through the core and record strip be as low as possible, and to this end the laminations must be held in relatively close face to face relationship. As can be seen from an examination of Figure 5, the total width of the recesses 223 formed in the shell halves 110 and 210 is stepped down at the forward end thereof in accordance with the various lengths of laminations and thus when the two shell halves are assembled together they hold the laminations of the core 23 in face to face contact with each other as illustrated in Figure 6.

For certain special types of recording, for example, the recording of extremely high frequencies or the recording of transients having steep wave fronts, an unusually narrow pole tip is required. The structure illustrated herein is readily modified for the special applications just mentioned, by eliminating the central lamination 123, and replacing it with an extremely thin layer of ferro-magnetic material. This thin layer may be deposited in any conventional manner, for example, by "sputtering," on the surfaces indicated by the numeral 223 in Figs. 5 and 6.

In apparatus employing "through magnetization" a pair of opposed pole pieces is held in a pair of housing blocks 16 preferably constructed by extrusion molding, from a plastic material such as polymerized phenolic resin and adapted not only to hold the pole pieces 10 but cylindrical coils 18 for inducing the magnetic flux in the pole pieces. As shown in Figure 1 the housing blocks 16 are disposed one on each side of a moving record strip 11 which moves therebetween in the direction shown by the arrows in Figs. 1 and 2. In the present embodiment the record strip is a steel tape and is relatively wide as compared to the width (dimension C in Fig. 4) of the pole tip lamination 123 and hence several sound tracks may be recorded side by side in a single strip. The pole piece 10 is mounted in the block 16 with its forward end slidably held in a round hole in the block 16 and its rearward end slidably supported in a rectangular hole in a support plate 22 screwed to the block 16 as illustrated in Figure 1. Since the hole which supports the forward end of the pole piece 10 is round, it may be accurately machined to precisely locate the pole tip. The support plate 22 also serves to hold the coil 18 in place in a cylindrical cavity coaxial with the pole piece 10. Electrical leads 21 from the coil 18 are brought out through a suitable passage in the bottom of the block 16.

After the coil 18, the support plate 22 and the pole piece 10 have been inserted in the order named, the rearward aperture in the block 16 is closed by cover plate 17 screwed to the block 16. The pole piece 10 was inserted with the spring 13 anchored in place as previously described. Thrust support for the spring is then provided in the form of a threaded plug 15 screwed into cover plate 17.

Thus, by reason of the spring 13 on each of the pole pieces 10, these parts are urged toward each other and frictionally engage the moving record strip passing therebetween. To achieve a minimum reluctance to flux passing from one pole piece, through the record material, and into the other pole piece, it is desirable that the end of the single lamination 123 be in close physical contact with the record strip 11. To this end, the sleeve 14 is made slightly shorter than the projecting cylindrical portion 114. Thus when the sleeve is assembled in place, the shell portion and the single lamination project slightly therefrom as indicated by a dotted line in Figure 6. The tip end of the pole piece 10 is then ground or lapped to produce a smooth plane surface normal to the axis of the pole piece.

In order to effect cooperation between the coils 18 to induce flux in the core 23 and produce the sound track, the coils are connected in series or in parallel so that current flow therethrough in a direction to produce a N pole at the tip of one pole piece, simultaneously produces a S pole at the tip of the other pole piece.

So as to provide a return path for flux from the rearward end of the pole pieces and to shield the same from extraneous magnetic fields, a cylindrical soft iron shield 19 is pressed on to each of the coils 18 and inserted therewith into the cylindrical cavity in the housing block 16. A pad 20 of rubber or similar resilient material is pressed against the end of each coil 18 to prevent the same from moving in the cylindrical cavity in the block 16 after it is inserted therein. It will be noted that the cylindrical shield 19 is turned in on the rearward end thereof to provide shielding for the end of the coil 18.

The pole piece mounting arrangement just described provides for easy removal of the pole pieces for adjustment or replacement. This is accomplished by unscrewing the plug 15 and withdrawing the pole piece through the threaded hole in the plate 17. As has been stated it is essential that the magnetic pole tip, viz., the forward end of the single lamination 123, be transversely disposed with respect to the record motion. In order then, to assure the proper orientation of a pole piece inserted through the plate 17, the cross-sectional outline at the point where the pole piece rests in the support plate 22 is made slightly prolate, that is, referring to Figure 3, one rectilinear dimension $b$ is somewhat greater than the other dimension $a$. The support aperture in the plate 22 is shaped to correspond to the pole piece which thus can be inserted only when in proper orientation with respect to the record strip.

One of the objects heretofore stated, is the provision of mounting means adapted to hold a pair of pole pieces in mutual alignment. With this object in mind, a pair of housing blocks 16 such as those illustrated may be either molded as an integral unit with a space therein for the record strip 11, or secured to a mutual support 9 as shown in Fig. 1, before the support hole in the forward end is finished. With the block thus secured, the round support holes in the two blocks may then be drilled or reamed simultaneously so that they become, in effect, parts of the same cylindrical surface. Thus when the pole pieces are inserted, they will be held in accurate mutual alignment. Furthermore, it is not necessary as in some previous devices of this nature, to adjust the pole tip position after the pole pieces 10 are inserted.

The sleeve 14 may, as was stated, be constructed of glass. In some cases, however, even harder material such as sapphire may be used. Such hard materials as glass and sapphire are well suited for this purpose since they not only resist the wear occasioned by the moving record, but may be accurately ground and/or lapped to provide a true cylindrical surface for sliding support in the block 16.

When a new record strip is to be removed or inserted in recording apparatus, including pole pieces and mounting means as illustrated, it is obviously desirable to separate the pole tips, during such removal or replacement. The design of the illustrated pole pieces contemplates retracting mechanism situated in the cavity lying generally to the rear of the support plate 22. This retracting mechanism is adapted to thrust against the flat under (left in Fig. 1) surface of the pole piece flange 12 whereby to compress the spring 13 and retract the pole piece. Such retracting mechanism is disclosed in my co-pending application Serial No. 744,190, filed April 26, 1947.

While the apparatus illustrated and described herein is fully capable of achieving the objects and providing the advantages heretofore stated, it is subject to considerable change within the spirit of the invention, and therefore I do not mean to be limited to the form shown and described but rather to the scope of the appended claims.

I claim:

1. A pole piece assembly for magnetic recording apparatus comprising in combination: a flux conducting core; a non-magnetic shell surrounding said core and secured thereto; a member in said core extending forwardly therefrom through said shell whereby to conduct flux from said core through said member and into a moving record in contact with the forward tip thereof; cylindrical means secured to said shell at the tip thereof adapted to resist wear occasioned by said record; a polygonal portion formed in the length of said shell; a spring secured to said shell and adapted to urge said core into contact with said record; means to support said core and shell for axial sliding motion thereof; a cylindrical bearing in said support means adapted to support and align the tip end thereof; polygonal bearing means in said support means adapted to support said core and shell at said polygonal portion thereof whereby to prevent rotation thereof while permitting said sliding motion; a coil secured in said support means surrounding said core whereby to induce flux therein; a threaded plug secured to said support means in position to anchor said spring, said plug being further adapted and positioned whereby the removal thereof permits the withdrawal of said shell and core from said support means while maintaining said coil in place.

2. In a pole piece assembly for magnetic recording apparatus, comprising in combination: a pair of assemblies as set forth in claim 1; and means to support said pair of assemblies in spaced relationship with said cylindrical bearings thereof in adjacent, coaxial alignment whereby said cores are coaxially supported with the tip ends thereof substantially in abutment and adapted to engage a moving sound record passing therebetween.

HERMAN S. HELLER.

REFERENCES CITED

The following references are of record in the file of this patent:

UNITED STATES PATENTS

| Number | Name | Date |
|---|---|---|
| 2,044,033 | Von Heising | June 16, 1936 |
| 2,098,596 | Rust | Nov. 9, 1937 |
| 2,181,707 | Perreault | Nov. 28, 1939 |
| 2,185,300 | Hickman | Jan. 2, 1940 |
| 2,229,326 | Heller | Jan. 21, 1941 |
| 2,270,320 | Liguori | Jan. 20, 1942 |
| 2,361,753 | Eilenberger | Oct. 31, 1944 |